Figure 1:
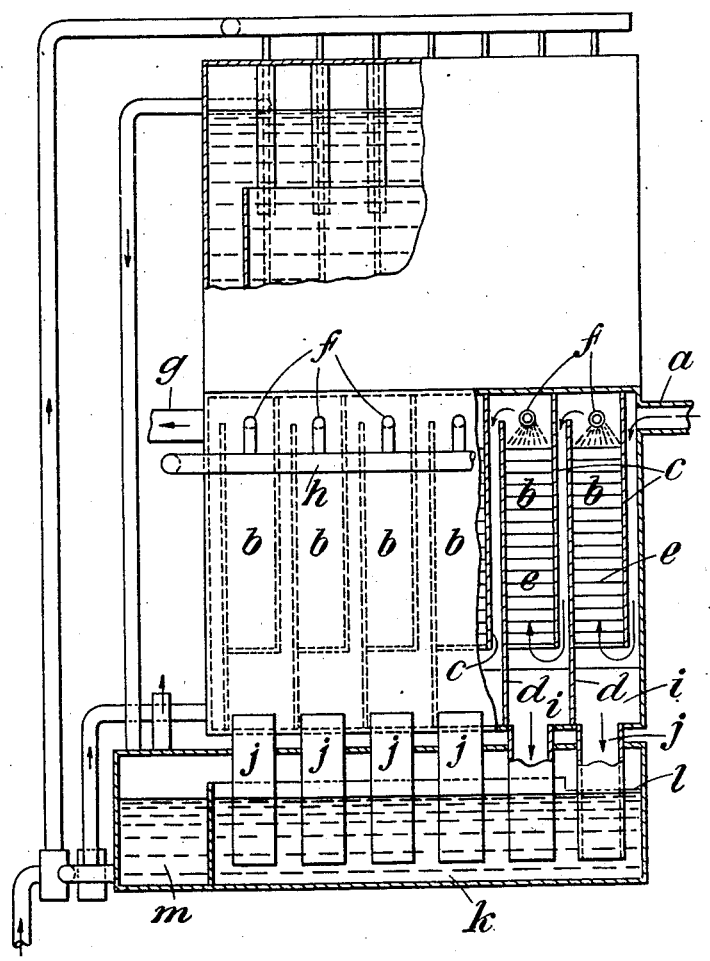

Inventors
R Walker
C. R. Wilkin
H. G. Cooper
J. T. Brown
By Glascock Downing & Seckel
Attys.

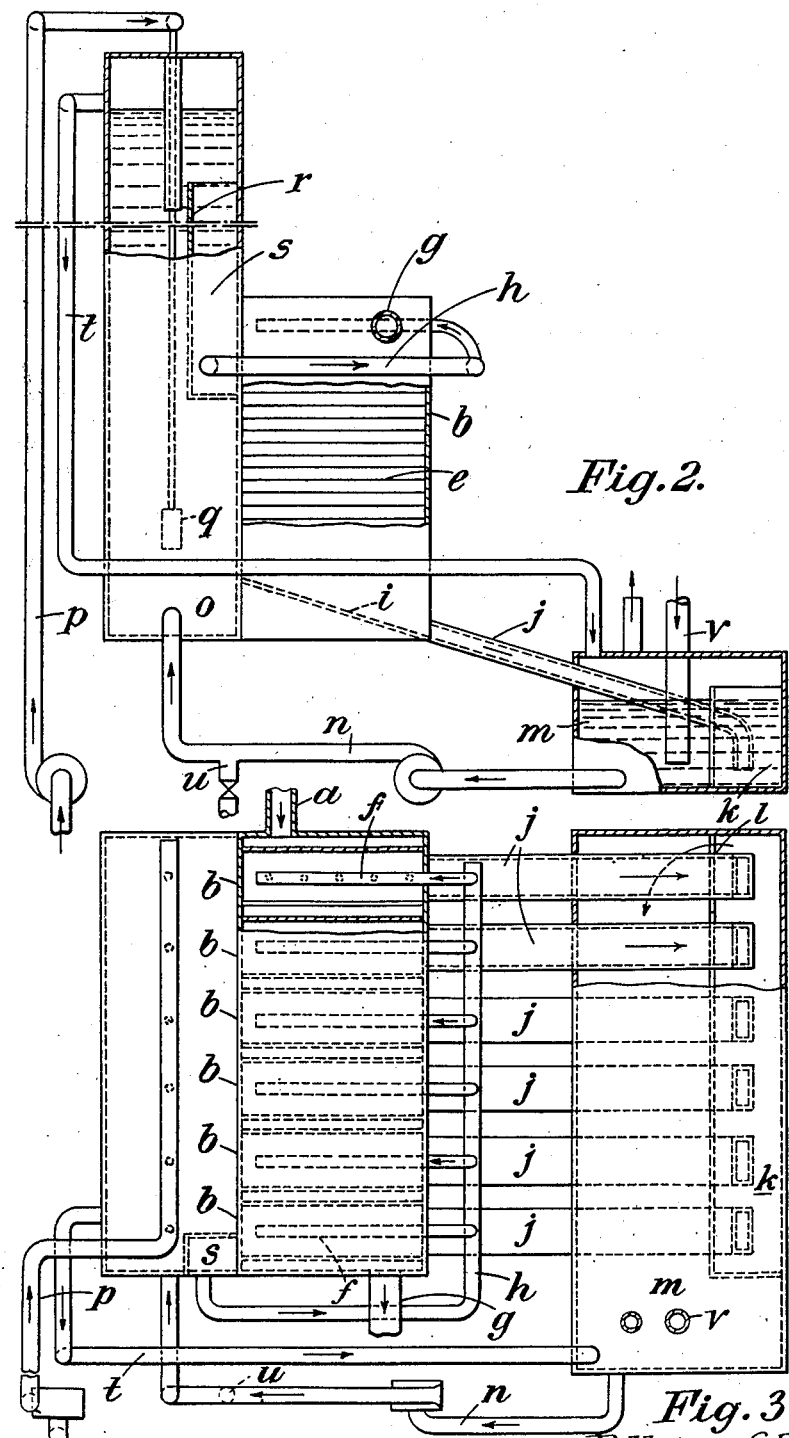

UNITED STATES PATENT OFFICE 2,503,528

REMOVAL OF HYDROGEN SULFIDE FROM GASES

Roland Walker and Cecil Raymond Wilkin, Manchester, Herbert George Cooper, Ashton-under-Lyne, and Joseph Thompson Brown, Alkrington, England Application October 18, 1946, Serial No. 703,990
In Great Britain November 5, 1945

3 Claims. (Cl. 23—2)

This invention relates to the removal of sulphuretted hydrogen from gases such as coal gas, water gas, oil gas, synthesis gas, hydrogen, etc., which are derived from coal, oil and natural gas and from effluent gases from industrial processes, by a process of the type in which the gas is washed with a carbonated alkaline suspension of hydrated oxide, carbonate or basic carbonate of iron with the result that the $H_2S$ is absorbed in the liquid with the formation principally of alkali hydrogen sulphide, which subsequently reacts with the iron compound to form an insoluble iron sulphide with regeneration of soluble alkali, the suspension of iron sulphide in regenerated alkali being then re-oxidized with air with liberation of elementary sulphur and regeneration of active iron compound.

The reactions occurring during a process of the above type are complex but may, as is well known, be simply represented as follows:

(a) $Na_2CO_3 + H_2S \rightleftarrows NaHCO_3 + NaHS$
(b) $NaHCO_3 + H_2S \rightleftarrows NaHS + CO_2 + H_2O$
(c) $3NaHS + 3NaHCO_3 + Fe_2O_3 = Fe_2S_3 + 3Na_2CO_3 + 3H_2O$
(d) $2Fe_2S_3 + 3O_2 = 2Fe_2O_3 + 6S$ The direct absorption of $H_2S$ by reaction with the active iron suspension also occurs to a small extent according to the reaction $$Fe_2O_3 + 3H_2S = Fe_2S_3 + 3H_2O$$

Plants in which sulphuretted hydrogen removal from gas is effected by a washing process of the type described above and which aim at as complete a removal of $H_2S$ as possible usually employ a very high tower or towers, commonly 40 feet or more and often 60 to 90 feet in height, containing lath type packing or the like, through which the gas and liquid pass in counter directions. With a single tower it is not practicable to effect a degree of sulphuretted hydrogen removal such as is required by statute in the gas industry, corresponding to a maximum permissible concentration of about 2 parts of $H_2S$ per million parts of gas, even when using a very large surfaced packing, while, when 2 or more such towers are employed in series, though purification is improved, the plant is very expensive and a considerable back pressure is set up to the gas being purified, involving high costs for boosting the gas and pumping the liquor. Further, even with high towers it is not possible, when using reasonable concentrations of iron in suspension, to complete in the towers of a commercial plant the reaction by which the soluble sulphide is converted into iron sulphide. In addition with high towers there are considerable difficulties of obtaining even distribution over the packing therein with a consequent loss of efficiency. In cases where the revivification of the purifying liquid by oxidation as it leaves the absorbing tower proceeds continuously with the absorption aforesaid, a considerable proportion of the soluble sulphide, which has not had time to react with the iron oxide suspension, is converted into oxyacid salts such as sulphates and thiosulphates which are a disadvantage in that they represent a waste of alkali and sulphur and give rise to toxic effluent liquor.

It is the object of this invention to provide an improved process which will reliably remove sulphuretted hydrogen from gas down to very low concentrations, such as are required, for example, in the gas industry, while at the same time offering but a low back pressure to the flow of gas through the purification apparatus, consuming a minimum quantity of alkali through conversion to oxyacid salts of sulphur which take no part in the reaction, or through conversion to other unreactive salts by reaction with freshly added iron compound, and producing elementary sulphur contaminated by the minimum amount of iron compounds and simultaneously consuming the minimum amount of iron.

With this object in view, the process according to the invention comprises subjecting the gas to at least three washings under similar conditions with a carbonated alkaline suspension of hydrated oxide, carbonate or basic carbonate of iron which is substantially free from soluble sulphides at the beginning of each washing, the concentrations and quantity of the suspension and the duration of the washings being so adjusted that each washing removes between 70% and 95% of the hydrogen sulphide present in the gas at the beginning of that washing, collecting the used suspension from all of the washings, and revivifying the suspension before using it again by subjecting it to the oxidising action of air.

The invention further consists in an improved apparatus for removing hydrogen sulphide from gases, which is suitable for carrying out the new process, and which comprises a plurality of similar towers to which the suspension is fed in parallel from a common source, and through which the gas passes in series, a tank for collecting the used suspension from all of the towers, and means for dispersing air through the collected suspension for revivifying same.

As already stated, the gas absorption reactions (a) and (b) above are reversible. We have examined the equilibrium conditions applying to the absorption of sulphuretted hydrogen from gases containing carbon dioxide with or without hydrocyanic acid by alkaline liquors in the absence of suspended iron compounds and have found that the equilibrium for a particular gas containing specific amounts of the acidic gases mentioned, viz. carbon dioxide and HCN, can be represented sufficiently closely for practical purposes by the formula (e) $$k = \frac{g}{NG}$$

where $g$ is the weight in grains of $H_2S$ present in combination in one gallon of the liquor withdrawn from the reaction space and G is the weight in grains of $H_2S$ initially present in 100 cu. ft. of the gas; and N is the concentration of the alkali present in solution in the liquid in the form of carbonate, bicarbonate, sulphide and hydro-sulphide and for our purpose normally lies between 0.1 and 1.5 expressed as normality of solution; and $k$ is substantially a constant for the particular gas with a definite content of $CO_2$ and/or other acidic gases at a particular temperature.

From this formula, having once determined $k$ for a particular gas to be purified, we are able to calculate what would be the final concentration of $H_2S$ in the liquid in contact with that gas when washing the gas with a solution of any particular alkali concentration. This equilibrium represents conditions at the bottom of a tower of infinite height, up which the gas and down which a limited volume of liquid are flowing, and it will be seen that $k$ is the reciprocal of the number of gallons of liquor necessary to remove all the $H_2S$ if perfect equilibrium between the gas and the liquid were obtained. In practice, such equilibrium is not reached in a washing tower and we prefer to use between 2 and 3 times the quantity of alkali theoretically necessary from the above formula to remove $H_2S$.

We have also found that when removing $H_2S$ from a gas by washing it in a tower with a regenerated suspension of iron hydroxide or carbonate in a carbonated alkali, the overall efficiency of removal of sulphuretted hydrogen is in agreement with that calculated from a formula of the type (f) below, up to a point at which between 70% and 95% of the total $H_2S$ originally present has been removed, the exact percentage depending on various circumstances. For taller towers giving a greater overall degree of removal, the efficiency of removal falls off and a much greater height of tower is required to achieve a given high degree of $H_2S$ removal than would be calculated from the formula. We therefore use a series of short towers, aiming only at between 70% and 95% of $H_2S$ removal in each tower and obtaining the desired overall degree of removal by the utilisation of a number of towers, as by this means the maximum efficiency of use of the washing space provided is obtained, this is an essential feature of our process.

(f) $$-\log_e S = KA = -\log_e(1-E)$$

where S is the ratio of concentration at outlet to concentration at inlet and where E is the fractional efficiency of removal, K is a constant and A is the total wetted intersurface area offered to the gas in the tower.

It is found that the same volume of liquid must be supplied to each tower in order to obtain the same degree of removal, for example, suppose we have a series of towers each removing 90% of the $H_2S$ entering it, we have determined that for a gas containing between 3% and 4% of $CO_2$, and a liquor containing 1% of ammonia, then at 20° C. $k=0.4$, so that for a gas entering the tower containing 500 grains of $H_2S$ per 100 cu. ft. we have $$0.4 = \frac{g}{1 \times 500}$$

i. e. $g=200$ grains per gallon, so that to remove 100% of the 500 grains of $H_2S$ entering per 100 cu. ft. of gas requires $$1.0 \times \frac{500}{200} = 2\frac{1}{2} \text{ gallons of alkali per hour}$$

We prefer to use from 2 to 3 times this amount, viz. approximately from 5 to 7 gallons per 100 cu. ft. of gas containing 500 grains of $H_2S$ per 100 cu. ft. and between 3% and 4% of $CO_2$. Similarly, it may be calculated that in the second tower, the gas entering which contains 50 grains of $H_2S$ per 100 cu. ft., $$0.4 = \frac{g}{1 \times 50}$$

i. e. $g=20$ grains per gallon, so that to remove 100% of 50 grains of $H_2S$ per 100 cu. ft. requires $$1.0 \times \frac{50}{20} = 2\frac{1}{2} \text{ gallons of alkali}$$

Again we should use 2 to 3 times this volume. That is, the conditions of operation which we prefer, require the supply to each tower of substantially equal volumes of the same liquor.

The actual number of towers which is suitable for use to purify any particular gas and the best degree of removal per tower between 70% and 95% to adopt depends on a number of circumstances, such, for example, as the cost for building, operating and housing. For example four towers, each designed to give 87.5% removal of the $H_2S$ entering or six shorter towers each designed for 75% removal would give the same final degree of removal. The number of towers used is the next whole number greater than $n$ in the formula;

(g) $$n = \frac{\log(1-E_o)}{\log(1-E_t)}$$

where $E_o$ is the desired degree of fractional removal of $H_2S$ from the entering gas and $E_t$ is the degree of fractional removal of $H_2S$ per tower or washing.

In the case of plants designed for removing sulphuretted hydrogen from town gas in this country, where the amount of $H_2S$ permitted in the final gas is subject to strict statutory limitation, we prefer to use 6 towers, of which one is in reserve as a safeguard, in the same way as it is present normal practice to allow an additional purifying box when removing sulphuretted hydrogen from town gas by means of boxes containing iron oxide. For coal gas containing 500 grains of sulphuretted hydrogen per 100 cu. ft. this requires approximately 82% removal in each of the 5 active towers to reduce the $H_2S$ to below 2 parts per million cubic feet, but we do not restrict ourselves to this arrangement for this duty, and we may use more or less towers for the purpose; when removing sulphuretted hydrogen from other gases the most suitable number of towers is not necessarily the same as that stated above.

We find that Reactions *a* and *b* above are the decisive ones during the washing in the towers, and, since these reactions are reversible and since also the soluble hydrosulphides appearing in the reaction formulae are readily dissociable, it is necessary in order to obtain the most rapid and complete removal of the sulphuretted hydrogen to arrange that the washing solution supplied to each tower shall be substantially free from such soluble sulphides. We have also found that the reaction represented by Formula *c*, which removes soluble sulphide from the solution is relatively very slow, and, when using a minimum concentration of iron in order to produce sulphur contaminated with as little iron as possible, while the liquor is descending the tower, very little reaction occurs. Provision is therefore made to allow the collected liquors from the several towers to remain in the collecting tank, before being oxidised, for a sufficient time for the reactions typified by Equation *c* to be substantially complete, so that there is substantially no soluble sulphide present in the liquor when it is oxidised. It is obviously desirable to operate with the minimum amount of iron, but we find that it is not satisfactory to operate with only the theoretical amount of reactive iron present in suspension to react with all the soluble alkali sulphides formed by removal of $H_2S$ from the gas by several washings, and we prefer to use at least twice the theoretical amount. We have also found that it is advisable to use newly precipitated or newly revivified iron reactant.

It will be apparent that the liquors from the various washings will vary considerable in concentration of sulphides but they will all have substantially the same percentage of iron reactant present. Thus if there were four washings and twice the amount of iron reactant theoretically required is used in the total liquor supply to all the towers, then with four similar streams of liquor flowing into the four towers, the liquor from the first tower may have therein say $9/10$ of the total hydrogen sulphide present, whereas it will contain only $\frac{1}{2}$ the total equivalent iron reactant. The three subsequent towers will have $9/100$, $9/1000$ and $9/10,000$ the total sulphide, yet they will have between them $3 \times \frac{1}{2}$ the total equivalent iron reactant. However, when the liquors from the four towers are brought together, there will be present therein twice the amount of reactant necessary theoretically to convert the soluble sulphide to the insoluble form.

We prefer to carry out the washing at temperatures between 20° C. and 30° C. because, although the absorption of $H_2S$ by our process is not adversely affected by operating at somewhat higher or somewhat lower temperatures than these and although the oxidation reactions are speeded up by increase of temperature, such high temperatures lead to the formation of thiosulphate, which represent a direct loss of alkali and, moreover, when ammonia is used as the alkali, the increased volatility of this reagent at higher temperatures leads to losses of it.

We have also found it to be essential for obtaining the minimum formation of fixed sulphur acids that the alkali carbonate used shall be free from caustic alkali.

We have also found it preferable to oxidise the iron sulphide by the introduction of very finely divided air bubbles at the bottom of a tower up which the suspension to be oxidised is flowing, as by this means we have been able to work with a consumption of the minimum amount of added air. The liquid and the air-froth are removed at the top of the said tower. It will be appreciated that it is desired to reduce to a minimum the amount of air which is blown through the solution, partly because the air, in bubbling through the suspension, forms a very stable froth from which it is difficult to remove the air, and partly because when ammonia is used as the alkali, the losses of this alkali are greater, the greater the volume of air used to oxidise the solution.

We have also found that the suspension of sulphur and iron reactant in alkali, which forms the working suspension, tends to froth when drops from the packing in the towers fall directly into the liquid. This frothing is a serious disadvantage within the washer and interferes with and obstructs the gas flow. According to the invention, such frothing is avoided by the use of sloping trays or conduits, which may have an angle of 15° to 20° to the horizontal, on to which it is arranged that all the descending liquid falls and is thereby conducted gently into the bulk of the liquid collected from all of the towers.

The gas velocity in a normal washing tower is from one to four feet per second, but we have found that higher velocities may be used with our process, though we do not wish to confine ourselves to the use of such higher velocities, and we have also found that, as would be expected on theoretical grounds, it is advantageous to pass the gas and liquid in counter directions through each tower, the gas passing upwards.

The invention further comprises removing, either continuously or in batches, a proportion of the total suspension for separation of the suspended solids and the return of all or any proportion of the separated clear liquor to the apparatus (the remainder being discarded to waste), also the maintenance of the necessary concentration of reactive iron compound, either by addition of freshly precipitated reactive iron compound, prepared outside the apparatus, or by the addition of an iron compound, such as copperas, suited to the formation by reaction with the alkali in the plant of a reactive precipitate or a precipitate which will become reactive in the plant. By increasing the concentration of iron reactant in the suspension, the rate of reaction between the alkali sulphide in solution and the iron reactant in suspension is increased, but by adhering to the conditions of this invention we need use a concentration of reactive iron compound not greatly exceeding twice the theoretical amount with the advantages already stated, viz. that the sulphur produced is only slightly contaminated with iron compounds and the consumption of iron compounds is at a minimum with the further result that where the precipitation of the iron compound is carried out in situ the amount of alkali consumed in this precipitation is a minimum.

The following are practical figures of an application of our invention to the purification of coal gas:

| | |
|---|---|
| Number of washing towers | 5 |
| Total height of packing in 5 towers | 30 ft. |
| Volume of liquor circulated per hour | 1750 galls. per tower or 8750 galls. |
| Gas volume per hour | 30,000 cu. ft. |
| Mean gas velocity through packing | 2 ft. per sec. |
| Contact time per washing operation | 3¼ seconds. |
| Concentration of alkali | 0.75% ammonia present as carbonate and bicarbonate. |
| $H_2S$ in foul gas at inlet | 500 grains/100 cu. ft. |

Concentration of H₂S in gas in grains per 100 cu. ft.

|  | Inlet | No. 1 | No. 2 | No. 3 | No. 4 | No. 5 |
|---|---|---|---|---|---|---|
| Calculated | | 71 | 10 | 1.4 | 0.2 | .04 .03 (Clean) |
| Actual | 505 | 75 | 10 | Traces | Clean | .04 |

Overall average degree of removal per tower ____ 86%.
Total degree of H₂S removal ____ 99.994%.

After the completion in a separate tank of the reaction to insolubilise the soluble sulphide, it was found during oxidation that less than 6% of the sulphur had been converted to oxy-sulphur acid salts.

The apparatus according to the invention is illustrated by way of example in the accompanying drawings, in which:

Figure 1 is a side elevation,
Figure 2 is an end elevation and
Figure 3 is a plan view, of one form of apparatus suitable for carrying out the method according to the invention.

The gas to be purified enters at $a$ and passes successively through six washing towers $b$, the partitions $c$, $d$ forming the towers being arranged to guide the gas in at the bottom and out at the top of each tower. Each tower contains a packing $e$ of any convenient form and has at the top a sprinkler $f$. The gas leaves the purifier at $g$.

The washing liquid is fed to all the sprinklers $f$ in parallel through the pipe $h$. It runs down over the packing $e$ onto an inclined surface $i$ and through sloping pipes $j$ to the bottom of the tank $k$, so that frothing is avoided. From the tank $k$ the liquid escapes over a weir $l$ into the larger tank $m$, from which it is pumped through the pipe $n$ to the bottom of the oxidising chamber $o$. The arrangement is such that the liquid remains in the tanks $k$ and $m$ for a sufficient time to allow substantially the whole of the soluble sulphides contained therein to react to form insoluble sulphides before the liquid is transferred to the oxidising chamber $o$.

Air is pumped through the pipe $p$ to distributors $q$ which release it in very finely divided bubbles at the bottom of the chamber $o$ so that it is dispersed through the liquid rising in the chamber. On reaching the upper part of the chamber $o$, the liquid flows over the partition $r$ into the chamber $s$, from which the pipe $h$ leads it to the sprinklers $f$. A pipe $t$ allows liquid and air-froth to overflow from the top of the chamber $o$ and return it to the tank $m$. Liquor may be withdrawn from the system through the branch $u$. Make up liquor may be supplied to the system by the pipe $v$.

What we claim is:

1. In the removal of hydrogen sulfide from gases containing the same which comprises passing a stream of gases to be freed from hydrogen sulfide through at least three washing zones in series washing said gases in each of said washing zones at a temperature of from about 20 to 30° C. with a single aqueous carbonated alkaline suspension of an iron compound selected from a class consisting of hydrated iron oxide, iron carbonate and basic carbonate of iron, said aqueous suspension being passed from a common source in parallel streams through each of said washing zones, said streams being admixed after passing through said washing zones; said alkaline suspension being substantially free from soluble sulfides, containing from 2 to 3 times the quantity of alkali theoretically required to produce maximum removal of hydrogen sulfide from said gases at each washing step and at least twice the amount of iron compound theoretically required to react with the soluble sulfides formed during all of the said washing operations; revivifying the mixed spent liquor recovered from the washing operations by subjecting it to the oxidizing action of air and passing the revivified liquor back to said common source.

2. The process of claim 1 wherein the spent liquor is permitted to stand prior to revivification for a time sufficient for the soluble sulfides therein to react with the said iron compound.

3. The process of claim 1 wherein the gases to be washed are passed in said washing operations in countercurrent to the washing liquor and wherein the spent liquor in the revivifying step is passed in parallel flow with a stream of air.

ROLAND WALKER.
CECIL RAYMOND WILKIN.
HERBERT GEORGE COOPER.
JOSEPH THOMPSON BROWN.

REFERENCES CITED

The following references are of record in the file of this patent:

UNITED STATES PATENTS

| Number | Name | Date |
|---|---|---|
| 1,029,528 | Bosch, et al. | June 11, 1912 |
| 1,525,140 | Mann, et al. | Feb. 3, 1925 |
| 1,690,437 | Sperr | Nov. 6, 1928 |
| 1,812,099 | Kohr | June 30, 1931 |
| 1,854,491 | Sperr | Apr. 19, 1932 |
| 2,081,960 | Sperr | June 1, 1937 |